(12) United States Patent
Beckham

(10) Patent No.: US 12,480,004 B1
(45) Date of Patent: Nov. 25, 2025

(54) SUPERHYDROPHOBIC ANTI-FOULING CRAYON HAVING CAPSAICIN, MEDETOMIDINE AND OTHER MACROFOULING INHIBITORS THAT IS TRANSPARENT TO ELECTRONIC SENSORS

(71) Applicant: BARNACLE-BLOCKER, LLC, Cortez, FL (US)

(72) Inventor: Lewis Steven Beckham, Cortez, FL (US)

(73) Assignee: Barnacle-Blocker, LLC, Cortez, FL (US)

( * ) Notice: Subject to any disclaimer, the term of this patent is extended or adjusted under 35 U.S.C. 154(b) by 0 days.

(21) Appl. No.: 19/032,617

(22) Filed: Jan. 21, 2025

Related U.S. Application Data

(60) Provisional application No. 63/732,448, filed on Aug. 19, 2024.

(51) Int. Cl.
| | | |
|---|---|---|
| C09D 13/00 | (2006.01) | |
| C09D 5/16 | (2006.01) | |
| C09D 7/63 | (2018.01) | |
| C09D 7/65 | (2018.01) | |
| C09D 191/00 | (2006.01) | |
| C09D 191/06 | (2006.01) | |

(52) U.S. Cl.
CPC ......... C09D 5/1625 (2013.01); C09D 5/1637 (2013.01); C09D 5/1656 (2013.01); C09D 7/63 (2018.01); C09D 7/65 (2018.01); C09D 13/00 (2013.01); C09D 191/005 (2013.01); C09D 191/06 (2013.01)

(58) Field of Classification Search
None
See application file for complete search history.

(56) References Cited

U.S. PATENT DOCUMENTS

| | | | | | |
|---|---|---|---|---|---|
| 1,997,794 | A | * | 4/1935 | Ibanez | C09D 5/16 106/224 |
| 5,226,380 | A | * | 7/1993 | Fischer | E02D 31/06 138/146 |
| 5,397,385 | A | * | 3/1995 | Watts | C09D 5/1625 428/688 |
| 5,629,045 | A | * | 5/1997 | Veech | B27K 3/50 514/646 |
| 5,985,010 | A | * | 11/1999 | Etscorn | A01N 65/38 424/DIG. 10 |
| 9,414,603 | B2 | * | 8/2016 | Messina | A01N 65/18 |
| 9,572,348 | B2 | | 2/2017 | Messina | |
| 10,053,584 | B1 | * | 8/2018 | Beckham | C09D 5/1625 |

FOREIGN PATENT DOCUMENTS

| | | |
|---|---|---|
| EP | 01113165 A | 12/2021 |
| FR | 2190892 A | 2/1974 |
| WO | WO2005027642 A1 | 3/2005 |
| WO | WO2019233985 A1 | 12/2019 |

* cited by examiner

*Primary Examiner* — Peter A Salamon
(74) *Attorney, Agent, or Firm* — Allen, Dyer, Doppelt & Gilchrist, P.A.

(57) ABSTRACT

A superhydrophobic anti-fouling crayon comprises a composition of capsaicin, wax, polydimethylsiloxane (PDMS), polytetrafluoroethylene (PTFE), and triglyceride, where the crayon is water insoluble, superhydrophobic, and transparent to electronic sensor and antennae signals. The crayon is rubbed onto the marine surface such that a layer of the composition of the crayon is applied thereto to produce a durable coating that inhibits fouling.

11 Claims, No Drawings

SUPERHYDROPHOBIC ANTI-FOULING CRAYON HAVING CAPSAICIN, MEDETOMIDINE AND OTHER MACROFOULING INHIBITORS THAT IS TRANSPARENT TO ELECTRONIC SENSORS

CROSS-REFERENCE TO RELATED APPLICATIONS

This application claims the benefit of U.S. provisional patent application 63/732,448 filed Aug. 19, 2024, which is hereby incorporated herein in its entirety.

TECHNICAL FIELD

The present invention relates to the field of antifouling coatings, and more particularly, to a superhydrophobic anti-fouling crayon comprising capsaicin, medetomidine and other macrofouling inhibitors that is transparent to electronic sensors.

BACKGROUND

Natural capsaicin is derived from peppers in the genus *Capsicum*. Ground dried peppers containing capsaicin, extracted capsaicin and synthetic capsaicin have all been used as additives in paint applied to the bottoms of boats and ships for the prevention of barnacle growth on those boats and ships. For example, Fischer, U.S. Pat. No. 5,226,380, Jul. 13, 1993; Watts, U.S. Pat. No. 5,397,385, Mar. 14, 1995 and Veech, U.S. Pat. No. 5,629,045 May 13, 1997 all used capsaicin in one or more forms as additives to paints and other coatings for application to the bottoms of boats and ships for prevention of barnacle growth. A master thesis, "Evaluating the Potential of Zosteric Acid and Capsaicin For the Use As Natural Product Antifoulants" by Qingwei Xu, December 2004 from The Ohio State University gave an extensive bibliography and background on the use and efficacy of capsaicin for prevention of barnacle growth.

In 1997 W. Gregory Cope, Michelle R. Bartsch and Leif L. Marking of the U.S. Geological Survey published "Efficacy of Candidate Chemicals for Preventing Attachment of Zebra Mussels (*Dreissena polymorpha*)" with results from testing 47 chemicals for prevention of Zebra mussel attachment. Capsaicin was identified as an efficacious product for preventing attachment with few environmental side effects.

Dahlstrom, et al, published a paper in the Journal Biofouling in February 2000 on the efficacy of medetomidine in preventing barnacle larvae from settling. Subsequently, a Swedish company began marketing medetomidine as an antifouling agent for use in bottom paints in the European Union, Japan and South Korea. As in the active compound described in U.S. Pat. No. 10,053,584 by the same inventor here, medetomidine did not kill the barnacle larvae. It prevented them from settling and attaching.

A common superhydrophobic product uses polydimethylsiloxane (PDMS) as an active ingredient in a spray on liquid for automobile glass. It is also incorporated in the rubber used in their windshield wiper blades.

Min Ruan, et al, published a paper in Royal Advances of Science in 2017 on using a combination of PDMS and polytetrafluoroethylene (PTFE) in a baked-on coating to achieve superhydrophobicity. They listed the superhydrophobic properties of the combination.

Eade, WO 2005/027642 A1 envisioned using capsaicin with a natural wax, preferably lanolin, with a solvent for application to timbers or as a paint additive.

Herzog, EP1967555 A1 described a similar system producing a mixture that would be liquid at room temperature for applying an anti-foulant to the bottoms of vessels while out of the water.

Other products on the market are a combination of capsaicin and lanolin and designed to be applied underwater or out of the water. One major drawback of the existing products is lack of durability. Being of a soft grease-like composition they wear off moving propellers and other surfaces easily.

SUMMARY

A superhydrophobic anti-fouling crayon that is rubbed on an underwater surface to produce a durable coating that inhibits fouling is disclosed. The crayon includes a composition of capsaicin, wax, polydimethylsiloxane (PDMS), polytetrafluoroethylene (PTFE), and triglyceride. The crayon is water insoluble, superhydrophobic, and transparent to electronic sensor and antennae signals.

In a particular aspect, the wax is beeswax and the triglyceride is a hydrogenated vegetable triglyceride. The composition may also include medetomidine and comprise an organic composition that is configured not to interfere with electronic signals.

The crayon may include about 25% to about 65% by weight of wax, about 25% to about 65% by weight of solid triglyceride, about 5% to about 15% by weight of PDMS, and about 0.5% to about 5% by weight of PTFE.

In another particular aspect, a method of preventing fouling of a marine surface using the superhydrophobic anti-fouling crayon includes rubbing the crayon onto the marine surface such that a layer of the composition of the crayon is applied thereto, and the rubbing step is performed underwater.

DETAILED DESCRIPTION

The present invention will now be described more fully hereinafter. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The present invention relates generally to a method and system for enhancing a durable, water insoluble coating to produce a superhydrophobic coating with broad spectrum antifouling properties. More specifically, the present invention is a method and system for a broad spectrum underwater applied macrofouling inhibition system produced from biologic materials with the addition of additives that produces a super hydrophobic, durable, water insoluble coating that prevents barnacle and *Dreissena* mussel attachment to underwater surfaces and is transparent to electronic transmission from sensors and antennae.

In U.S. Pat. No. 10,053,584 the present inventor disclosed a unique blend of pharmaceutical grade capsaicin and/or other active ingredients, beeswax and a solid hydrogenated vegetable triglyceride for producing a crayon-like delivery system that is rubbed on an underwater or out of water surface to produce a durable coating that inhibits the underwater attachment of new macrofouling organisms such as barnacles and *Dreissena* mussels. In addition to its durability once applied, the water insolubility of the crayon-like delivery system allows the coating to be applied underwater-so it is not necessary to remove the surface from the water before application.

In order to increase the spectrum of macrofouling organisms controlled, additional active ingredients such as, but not limited to, medetomidine (CAS 86347-14-00, tralopyril (CAS 122454-29-90, zinc pyrithione (CAS 13463-41-7), and others may be added to the crayon-like delivery system without changing the final result. In order to reduce the drag and change the micro/nano surface chemistry through the water of the treated propeller, towed array, autonomous underwater drone or other underwater surface additional ingredients such as polydimethylsiloxane (PDMS, CAS 9006-65-9) and/or polytetrafluoroethylene (PTFE, CAS 9002-84-0) are added.

According to an embodiment of the present invention, a durable water insoluble coating delivery system includes a mixture of capsaicin, natural or synthetic, and other active ingredients, blended into molten mixture of beeswax, a solid hydrogenated vegetable triglyceride, PDMS and PTFE. The finished cooled product produces a coating having the same water insolubility, durability and other properties as when applied using the original crayon-like delivery system, but with additional properties such as broader spectrum anti-fouling and superhydrophilicity.

Advantageously, the crayon-like delivery system is formed first in a warmed double-boiler or other suitable warming vessel between 45-70 C°. Preferred percentages of the beeswax and solid hydrogenated vegetable triglyceride by weight range between 25 and 65 percent each. Preferred percentage of the polydimethylsiloxane (PDMS) ranges between 5 and 15 percent by weight. Preferred percentage of polytetrafluoroethylene (PTFE) ranges between 0.5 and 5 percent by weight and must be blended using a homogenizer. Excessive amounts of either PDMS or PTFE reduce the durability of the finished product.

The non-ionic active ingredients such as capsaicin and medetomidine are blended together while in a molten state producing a uniform mixture. Ionic active ingredients such as tralopyril and zinc pyrithione are added with suitable adjuvants and/or blended in using a homogenizer. The molten blend is poured into molds or applicator, which cools and hardens producing the water insoluble crayon-like product.

The finished product may be applied by rubbing on to a cleaned surface either out of the water or underwater or remelted and brushed on to a cleaned surface out of the water.

Although the invention has been explained in relation to its preferred embodiment, it is to be understood that many other possible modifications and variations can be made without departing from the spirit and scope of the invention as herein described.

For example, in a particular aspect the present invention comprises a crayon-like composition of capsaicin (natural, synthetic or combination), beeswax, a hydrogenated vegetable triglyceride, PDMS and PTFE creating a delivery system for capsaicin and other anti-foulant active ingredients. Accordingly, an object of the invention is to prevent macrofouling organisms such as barnacles and *Dreissena* mussels from attaching and growing on underwater ship and boat parts, towed arrays, unmanned underwater drones and other underwater structures and surfaces. The composition may be applied underwater, and it adheres to underwater surfaces and surfaces when underway. The composition does not dissolve in water and may be applied over existing bottom paint or coatings.

The composition of beeswax, hydrogenated vegetable triglyceride, PDMS and PTFE generates a crayon-like superhydrophobic delivery system which may be mixed with other organic and inorganic anti-macrofoulants for reducing the solubility of said anti-macrofoulants into the environment after underwater application. The composition of organic compounds does not interfere with electronic signals from sensors and/or antennae coated with the same.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A superhydrophobic anti-fouling crayon comprising a composition of:
   capsaicin;
   wax;
   polydimethylsiloxane (PDMS);
   polytetrafluoroethylene (PTFE); and
   triglyceride;
   wherein the crayon is water insoluble, superhydrophobic, and transparent to electronic sensor and antennae signals.

2. The superhydrophobic anti-fouling crayon of claim 1, wherein the wax is beeswax.

3. The superhydrophobic anti-fouling crayon of claim 1, wherein the triglyceride is a hydrogenated vegetable triglyceride.

4. The superhydrophobic anti-fouling crayon of claim 1, further comprising medetomidine.

5. The superhydrophobic anti-fouling crayon of claim 1, comprises an organic composition that is configured not to interfere with electronic signals.

6. The superhydrophobic anti-fouling crayon of claim 1, wherein the crayon comprises about 25% to about 65% by weight of wax.

7. The superhydrophobic anti-fouling crayon of claim 1, wherein the crayon comprises about 25% to about 65% by weight of solid triglyceride.

8. The superhydrophobic anti-fouling crayon of claim 1, wherein the crayon comprises about 5% to about 15% by weight of PDMS.

9. The superhydrophobic anti-fouling crayon of claim 1, wherein the crayon comprises about 0.5% to about 5% by weight of PTFE.

10. A method of preventing fouling of a marine surface using a superhydrophobic anti-fouling crayon comprising a composition of capsaicin, wax, polydimethylsiloxane, polytetrafluoroethylene, and triglyceride, the method comprising:
    rubbing the crayon onto the marine surface such that a layer of the composition of the crayon is applied thereto.

11. The method of claim 10, wherein the rubbing step is performed underwater.

* * * * *